United States Patent Office 3,025,257
Patented Mar. 13, 1962

3,025,257
DESTATICIZED VINYL-TYPE RESINS
Myron A. Coler, Scarsdale, Janice A. Cutler, Long Island City, and Arnold S. Louis, Riverdale, N.Y. (all of 155 Waverly Place, New York 14, N.Y.)
No Drawing. Filed Sept. 4, 1958, Ser. No. 758,899
9 Claims. (Cl. 260—32.6)

This invention relates to improved molding compositions to methods of molding same and to the improved articles resulting therefrom. More particularly it relates to vinyl-type resin compositions which are distinguished by improved molding properties and are further characterized by a significantly diminished tendency to accumulate an electrostatic charge during manufacture or use of articles from such compositions.

In brief, it has been found that the incorporation of limited amounts of specified alkanol amines and amides of aliphatic carboxylic acids in polystyrene or other vinyl-type resin materials produced articles with the desired combination of properties, and particularly with improved electrostatic properties.

One of the problems confronting manufacturers, molders and users of molded plastics is the collection of dust on the surfaces of molded articles, especially articles of polystyrene or polystyrene based compositions. The dust is tenaciously held on upper, side and lower surfaces of the article by an electrostatic field, usually produced during the molding operation and particularly during ejection of the article from the mold.

The electrostatic field appears to be not only a surface phenomenon, but also to be distributed throughout the entire volume of the molded article. Consequently prior art conventional treatments of the surface alone are of very limited value, since the field created is not merely on the surface. One specific object of the present invention is to render unnecessary such prior art surface treatments, intended to minimize electrostatic charge buildup in finished articles.

Although the electrostatic field is weakened with time, it may persist for months and even years. Hence the ultimate user is confronted with dust accumulation problems originating at the time of molding and persisting despite the interim use of protective wrappings.

Moldings often appear particularly "dirty" due to non-uniformity in dust pickup. The pickup tends to be strongest over regions in thin cross-section and high curvature and in recessed areas which are particularly difficult to reach and to clean.

Many treatments have been proposed to alleviate the problem, but such solutions have met with but limited success. Because of the inadequacy of treatments directed only to the surface, those skilled in the art have sought with little or no success to disperse a destaticizing material throughout the volume of the article to be destaticized. A great variety of destaticizing agents have been investigated including conductive materials such as metal powders and carbon. Such treatments have only limited applicability because these additives change the color, transparency, plastic flow and other physical properties to such an extent as to destroy the very advantages which distinguish polystyrenes or other clear plastics.

The materials disclosed in earlier applications filed by the present applicants as destaticizing agents compatible with plastics produced by polymerization of vinyl-type monomers include combinations of alkanol amines with carboxylic acids disclosed and claimed in copending application Serial No. 679,098. Although articles produced from such materials exhibit electrostatic properties far superior to those produced from articles incorporating either of the added materials, the use of carboxylic acids is accompanied by the necessity for closely controlling the amount of acid, since the presence of excessive amounts of free acid tends to weaken or destroy the beneficial destaticized properties and to yellow the moldings.

In order to produce an anti-static plastic characterized by a high degree of extrudability we have found it advantageous to incorporate limited amounts of combinations of alkanol amines and amides of aliphatic carboxylic acids in molding compositions of vinyl-type resins.

The expression "vinyl-type resins" as herein employed is intended to include all polymers formed by the polymerization of monomers having a polymerizable C=C double bond and hence includes vinyls (e.g. styrene), vinylidenes (e.g. vinylidene chloride), and acrylics (e.g. methacrylates), both substituted and unsubstituted and both homopolymers and copolymers and mixtures thereof.

The alkanol amines which have been found suitable include monoalkanol amines (e.g. diethyl ethanol amine); di-alkanol amines (e.g. diethanol amine and di-isopropanol amine); substituted di-alkanol amines (e.g., N-butyldi-ethanolamine); trialkanol amines (e.g. triethanol amines, and tri-isopropanol amine which is particularly preferred). Suitable alkanol amines may be generally represented by the formula

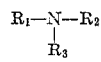

wherein $R_1$ is an alkanol group with from 2 to 8 carbons; and either or both $R_2$ and $R_3$ are alkanol groups with from 2 to 8 carbons, or either or both are alkyl groups with from 1 to 8 carbons or either or both are H.

Formulations may contain one or more of the alkanol amines, provided that the total amount of amine constituent in the composition, in relation to the amide present should not exceed the limits which are later specified in this application.

The other constituent of our additive is an amide of an aliphatic carboxylic acid. Suitable amides are those amides of aliphatic acids having between 4 and 18 and preferably about 9 carbon atoms in the chain. Both monobasic and dibasic carboxylic acids are suitable in the practice of our invention.

Because the presence of excessive amounts of additive results in finished articles more susceptible to heat distortion, each percent producing a lowering of the distortion temperature of about 2 to 4° C., and in finished articles which are undesirably streaked or iridescent, it is important that the total amount of additive be no more than that required to produce destaticized articles. We have found that when combinations of suitable alkanol amines and aliphatic amides are employed, the total amount of additive may be held below about 2% of the weight of the resin without loss of the desired properties. In practice, it is preferred to use between 0.5% and 10% of the additive, based on the weight of the composition and preferably between 0.5% and 2% for best physical properties.

In the additive, the relative proportions of alkanol amine and aliphatic amide which may be used extend over a wide range. While we do not wish to be bound by any specific theory, it appears that the presence of as little as 1 mol percent of the aliphatic amide greatly enhances the effectiveness of the mixture. The relative proportions of aliphatic amide to alkanol amine should preferably be such that the mixture contains from 1 to 233 amide groups for each 100 amine nitrogens in the mixture.

Such mixtures have been found to be particularly effective in destaticizing injection molded articles formed of vinyl-type polymers as above defined. The polymers may be homopolymers, or copolymers, or mixtures containing such polymers. The vinyl-type monomer may be either unsubstituted or alkyl- or halogen substituted. Because the accumulation of electrostatic charge is particularly troublesome in the injection molding of polystyrene, wherein the charge build-up appears to be due in part to the contact potential between the mold and the plastic during filling of the mold cavity and to the forces operating during stripping of the article from the mold, we have described preferred embodiments of our invention in reference to compositions based on polystyrene, but it is to be understood that this is by way of illustration and not by way of limitation.

EXAMPLE 18.2 grams pelargonamide (nonamide) was blended with 72.8 grams tri-isopropanol amine in a Waring Blendor, whereby a paste was formed. This mixture was then incorporated in polystyrene (Monsanto Lustrex L2020) in an amount sufficient to be present as 2% of the mixture. The additive was mixed with the resin in a sigma blade mixer and 1.3 grams of titanium dioxide per pound of polystyrene was added to the charge. The resulting composition was extruded and injection molded, on a Van Dorn injection molder Model No. 1, using a 400° F. feed barrel temperature with a water cooled mold. A dwell time of about 10 seconds was used. The moldings were tested immediately after ejection by means of a Keithly Voltmeter. They were also checked by means of lamp-black blown from a spray gun. The dust spray patterns were rated 4–5 on an arbitrary basis as compared with polymers to which there had been added about 2% by weight of tri-isopropanol amine which were rated about 18 on the same basis. The lower ratings, of course, represented much smaller amounts of dust and were excellent as compared with previous results.

Other compositions were prepared and tested with results as indicated in the following table:

Table

[All parts are by weight]

| Polymer | Amine | Amide | Electrostat rating, v. |
|---|---|---|---|
| 1. Polystyrene (98) | Tri-isopropanol amine (1.6). | Pelargonamide (0.4). | 0.0 |
| 2. Polystyrene (99) | Triethanol amine (0.8). | $C_{12}$–$C_{14}$ amide (ARMID C) (0.2). | 2.0 |
| 3. Butadiene-styrene-copolymer (98). | Di-isopropanol amine (1.95). | Octanamid (ARMID 8) (0.05). | 0.0 |
| 4. Poly-α-methyl-styrene (99.5). | N-butyl-diethanol amine (0.25). | Hexanamide (0.25). | 3.0 |
| 5. Polyethylene (99) | Triisopropanol (0.99). | Pelargonamide (0.01). | 0.2 |
| 6. Polyethylene (98) | Di-methyl isopropanol amine (1.6). | $C_{18}$ amide (ARMID O) (0.4). | 1.0 |
| 7. Copolymer acrylonitrile and styrene (98). | Di-ethanolamine (1.6). | Butyramide (0.4) | 0.5 |
| 8. Polyvinyl chloride (98). | N-butyl diethanol amine (1.5). | Lauramide (0.5) | 0.1 |
| 9. Polyvinyl chloride (99). | Tri-isopropanol amine (0.6). | Caprylamide (0.4) | 0.5 |
| 10. Polymethylmethacrylate (99). | Di-ethanol amine (0.9). | Pelargonamide (0.1). | 0.0 |
| 11. Polymethylmethacrylate (98). | N-ethyl bis (2 ethyl hexanol 4) amine (1.6). | Lauramide (0.4) | 2.0 |
| 12. Polyvinylidene chloride (99.5). | Hexyl diethanol amine (0.25). | Hexanamide (0.25). | 3.0 |
| 13. Polyvinylidene chloride (98). | Dimethyl isopropanol amine (1.6). | $C_{18}$ Amide (ARMID O) (0.4). | 4 |
| 14. Polystyrene | None | None | 20 |

The additives of the present invention may be incorporated in larger amounts than those illustrated in the foregoing example, where it is advantageous to produce and market concentrates containing far more additive than is likely to be useful in a molding composition. Such concentrates may be later blended with additional resin to produce the desired molding composition. Concentrates or "master batches" may contain up to about 33% of the additive without any noticeable impairment of its effectiveness in subsequently diluted compositions.

It will be understood by others skilled in the art that the compositions of the present invention may also include fillers, dyes or other coloring matter and such other additives as are commonly employed to facilitate the use of resins in molding processes, e.g. plasticizers, or the like, without departure from the intended scope of our invention as defined in the following claims.

We claim:

1. A composition comprising a polymer of vinylidene monomer destaticized by the addition thereto of a total of between 0.5% and 10% by weight of both (1) alkanol amine represented by

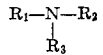

wherein $R_1$ is alkanol with 2 to 8 carbons and $R_2$ and $R_3$ are each selected from the group consisting of alkanol with 2 to 8 carbons, alkyl with 1 to 8 carbons and hydrogen and (2) aliphatic amide of the group consisting of the amides of mono- and di-carboxylic acids with from 4 to 18 carbon atoms.

2. The composition of claim 1 wherein the relative proportion of amine to amide is such that the mixture contains from 1 to 233 amide groups for each 100 amine nitrogens.

3. A composition of matter comprising polystyrene and containing between 0.5% and 10% by weight total of both an alkanol amine represented by the general formula

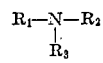

wherein $R_1$ is alkanol with 2 to 8 carbon atoms and $R_2$ and $R_3$ each represents a monovalent radical selected from the group consisting of hydrogen, alkanol with 2 to 8 carbon atoms and alkyl with 1 to 8 carbon atoms, and aliphatic amide selected from the group consisting of amides of mono- and dicarboxylic acids with from 4 to 18 carbon atoms.

4. A process of producing destaticized injection molded articles comprising incorporating into polymer of vinylidene monomer a total of between 0.5% and 10% by weight of an alkanol amine represented by the general formula

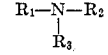

wherein $R_1$ is alkanol with 2 to 8 carbon atoms and $R_2$ and $R_3$ each represents a monovalent radical selected from the group consisting of hydrogen, alkanol with 2 to 8 carbon atoms and alkyl with 1 to 8 carbon atoms, and aliphatic amide selected from the group consisting of amides of mono- and dicarboxylic acids with from 4 to 18 carbon atoms and injection molding the resulting composition.

5. An improved process of injection molding which comprises incorporating into a polymer of a vinylidene monomer a total of between 0.5% and 2% by weight of an alkanol amine represented by the general formula

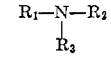

wherein $R_1$ is an alkanol with 2 to 8 carbon atoms and $R_2$ and $R_3$ each represents a monovalent radical selected from the group consisting of hydrogen, alkanol with 2 to 8 carbon atoms and alkyl with 1 to 8 carbon atoms, and aliphatic amide selected from the group consisting of amides of mono- and dicarboxylic acids with from 4 to 18 carbon atoms wherein the relative proportions of alkanol amine to aliphatic amide are between 1 and 233 amide groups for each 100 amine nitrogens; and injection molding the resulting composition.

6. The destaticized injection molded article resulting from the process of claim 5.

7. The article of claim 6 in which the polymer is polystyrene.

8. A molded polystyrene article containing a total of between 0.5% and 10% by weight of a destaticizing additive composed of triisopropanol amine and pelargonamide.

9. A composition of matter comprising polystyrene containing a total of between 0.5% and 10% by weight of triisopropanol amine and pelargonamide.

References Cited in the file of this patent

UNITED STATES PATENTS

| | | |
|---|---|---|
| 2,067,202 | Pool et al. | Jan. 12, 1937 |
| 2,556,045 | Serdynsky et al. | June 5, 1951 |
| 2,624,725 | Bjorksten et al. | Jan. 6, 1953 |
| 2,773,852 | Rowe et al. | Dec. 11, 1958 |
| 2,938,879 | Mock et al. | May 31, 1960 |

OTHER REFERENCES

Hayek: American Dyestuff Reporter, pages 368–371, June 7, 1954.